(12) United States Patent
Kang et al.

(10) Patent No.: US 11,146,960 B2
(45) Date of Patent: Oct. 12, 2021

(54) APPARATUS AND METHOD FOR HANDLING ESIM PROFILE FOR ISSP DEVICE

(71) Applicant: Samsung Electronics Co., Ltd., Suwon-si (KR)

(72) Inventors: Sujung Kang, Suwon-si (KR); Duckey Lee, Suwon-si (KR); Jonghan Park, Suwon-si (KR); Kangjin Yoon, Suwon-si (KR); Jonghoe Koo, Suwon-si (KR); Hyewon Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/737,769

(22) Filed: Jan. 8, 2020

(65) Prior Publication Data

US 2020/0221294 A1  Jul. 9, 2020

(30) Foreign Application Priority Data

Jan. 8, 2019 (KR) .................. 10-2019-0002202
Jul. 19, 2019 (KR) .................. 10-2019-0087831

(51) Int. Cl.
*H04M 11/00* (2006.01)
*H04W 12/30* (2021.01)
(Continued)

(52) U.S. Cl.
CPC ......... *H04W 12/35* (2021.01); *H04L 63/0853* (2013.01); *H04M 3/382* (2013.01);
(Continued)

(58) Field of Classification Search
CPC ......... H04W 4/003; H04W 8/20; H04W 8/18; H04W 8/186; H04W 4/60; H04L 63/0853
See application file for complete search history.

(56) References Cited

U.S. PATENT DOCUMENTS

2012/0117635 A1* 5/2012 Schell .................. H04W 12/06
726/9
2015/0111573 A1* 4/2015 Barton .................. H04W 8/18
455/435.1

(Continued)

FOREIGN PATENT DOCUMENTS

| EP | 3413685 A1 | 12/2018 |
| WO | 2018/001449 A1 | 1/2018 |
| WO | 2018/145547 A1 | 8/2018 |

OTHER PUBLICATIONS

International Search Report dated Apr. 13, 2020 in connection with International Patent Application No. PCT/KR2020/000268, 3 pages.

(Continued)

*Primary Examiner* — Shantell L Heiber

(57) ABSTRACT

A method and apparatus for providing a communication service by installing an eSIM profile even in a terminal to which an iSSP is applied. The method comprises: detecting whether information is input information for eSIM profile download input information from a terminal to which an iSSP is applied, and determining whether the terminal supports the same. Collecting eSIM bundle information of the iSSP by the terminal; selecting an eSIM bundle to be used by referring to a condition designated by the terminal from among the collected eSIM bundles; if there is no bundle to be used or when it is determined that no eSIM bundle is used among existing eSIM bundles, generating an eSIM bundle by the terminal itself or providing an eSIM bundle via communication with the terminal and a server; and on the basis of eSIM bundle information, downloading and installing an eSIM profile package.

18 Claims, 8 Drawing Sheets

(51) Int. Cl.

| | | |
|---|---|---|
| *H04M 3/42* | (2006.01) | |
| *H04W 4/60* | (2018.01) | |
| *H04W 8/20* | (2009.01) | |
| *H04L 29/06* | (2006.01) | |
| *H04M 3/38* | (2006.01) | |
| *H04W 12/42* | (2021.01) | |

(52) U.S. Cl.
CPC ... *H04M 3/42153* (2013.01); *H04M 3/42229* (2013.01); *H04W 4/60* (2018.02); *H04W 8/205* (2013.01); *H04W 12/42* (2021.01)

(56) References Cited

U.S. PATENT DOCUMENTS

| | | | | |
|---|---|---|---|---|
| 2016/0021529 | A1* | 1/2016 | Park | H04W 8/205 455/410 |
| 2017/0338954 | A1 | 11/2017 | Yang et al. | |
| 2017/0366962 | A1* | 12/2017 | Kim | H04W 48/16 |
| 2018/0027407 | A1 | 1/2018 | Veneroso | |
| 2018/0288560 | A1 | 10/2018 | Naik et al. | |
| 2019/0253874 | A1 | 8/2019 | Salmela et al. | |
| 2019/0327605 | A1 | 10/2019 | Fan et al. | |
| 2019/0394053 | A1 | 12/2019 | Yu et al. | |
| 2020/0021973 | A1* | 1/2020 | Anslot | H04W 48/18 |
| 2020/0092095 | A1* | 3/2020 | Yang | H04W 8/186 |
| 2020/0120484 | A1* | 4/2020 | Ullah | H04W 8/183 |
| 2020/0186992 | A1* | 6/2020 | Bas Sanchez | H04W 8/20 |

OTHER PUBLICATIONS

Written Opinion of the International Searching Authority dated Apr. 13, 2020 in connection with International Patent Application No. PCT/KR2020/000268, 4 pages.

"Smart Secure Platform (SSP); Integrated SSP (iSSP) characteristics (Release 15)", ETSI TS 103 666-2 V0.6.0 (May 2018), 18 pages.

Supplementary European Search Report dated Jul. 23, 2021 in connection with European Patent Application No. 20 73 9010, 9 pages.

* cited by examiner

APPARATUS AND METHOD FOR HANDLING ESIM PROFILE FOR ISSP DEVICE

CROSS-REFERENCE TO RELATED APPLICATIONS

This application is based on and claims priority under 35 U.S.C. 119 to Korean Patent Application No. 10-2019-0002202 filed on Jan. 8, 2019, and Korean Patent Application No. 10-2019-0087831 filed on Jul. 19, 2019 in the Korean Intellectual Property Office, the disclosures of which are herein incorporated by reference in their entirety.

BACKGROUND

1. Field

The disclosure relates to a method and apparatus for downloading, storing, and installing an eSIM profile in a terminal to which an integrated smart secure platform (iSSP) is applied.

2. Description of Related Art

In order to meet wireless data traffic demands that have increased after 4G communication system commercialization, efforts to develop an improved 5G communication system or a pre-5G communication system have been made. For this reason, the 5G communication system or the pre-5G communication system is called a beyond 4G network communication system or a post LTE system. For this reason, the 5G communication system or the pre-5G communication system is called a beyond 4G network communication system or a post LTE system. In order to achieve a high data transmission rate, an implementation of the 5G communication system in a mmWave band (for example, 60 GHz band) is being considered.

In the 5G communication system, technologies such as beamforming, massive MIMO, Full Dimensional MIMO (FD-MIMO), array antenna, analog beam-forming, and large scale antenna are being discussed as means to mitigate a propagation path loss in the mmWave band and increase a propagation transmission distance.

Further, the 5G communication system has developed technologies such as an evolved small cell, an advanced small cell, a cloud radio access network (RAN), an ultra-dense network, device to device communication (D2D), a wireless backhaul, a moving network, cooperative communication, coordinated multi-points (CoMP), and received interference cancellation to improve the system network.

In addition, the 5G system has resulted in the development of hybrid FSK and QAM modulation (FQAM) and sliding window superposition coding (SWSC), which are advanced coding modulation (ACM) schemes, and filter bank multi carrier (FBMC), non-orthogonal multiple access (NOMA), and sparse code multiple access (SCMA), which are advanced access technologies, and the like. Meanwhile, the Internet has been evolved to an Internet of Things (IoT) network in which distributed components, such as objects, exchange and process information from a human-oriented connection network in which humans generate and consume information.

An Internet of Everything (IoE) technology in which a big data processing technology through a connection with a cloud server or the like is combined with the IoT technology has emerged. In order to implement IoT, technical factors such as a sensing technique, wired/wireless communication, network infrastructure, service-interface technology, and security technology are required, and research on technologies such as a sensor network, Machine-to-Machine (M2M) communication, Machine-Type Communication (MTC), and the like for connection between objects has recently been conducted.

In an IoT environment, through collection and analysis of data generated in connected objects, an intelligent Internet Technology (IT) service to create a new value for peoples' lives may be provided. The IoT may be applied to fields such as those of a smart home, a smart building, a smart city, a smart car, a connected car, a smart grid, health care, a smart home appliance, or high-tech medical services through the convergence of the conventional Information Technology (IT) and various industries. Accordingly, various attempts to apply the 5G communication to the IoT network are made. For example, the 5G communication technology, such as a sensor network, machine-to-machine (M2M) communication, and machine-type communication (MTC), has been implemented by a technique, such as beamforming, MIMO, and array antennas. The application of a cloud RAN as the big data processing technology may be an example of convergence of the 5G technology and the IoT technology.

As it is possible to provide a variety of services in accordance with the above description and development of the mobile communication system, there is a demand for a method for effectively providing such services. Further, in the wireless communication system including an authentication control module for network access of a subscriber to access the mobile communication system, security media, such as an embedded UICC (eUICC), an integrated UICC (iUICC), and an integrated secure service platform (iSSP), is under development-application or development as an evolved form of a universal integrated circuit card (UICC).

SUMMARY

In the related art, because a method of processing a remote SIM provisioning (RSP) protocol for supporting an eSIM is not defined in an iSSP terminal equipped with an iSSP, it was not possible to download an eSIM profile by using eSIM infra, such as an SM-DP+ server and an activation code, in the iSSP terminal. Accordingly, an aspect of the disclosure is to solve the above problem.

In a method for installing an embedded subscriber identity module (eSIM) profile by a terminal applying an integrated smart secure platform (iSSP) according to the disclosure, which is to solve the above problem, the method may include: receiving an input of an activation code; obtaining information on an eSIM bundle where the eSIM profile is installed, in case that the activation code is related to a request of an eSIM profile; performing an eSIM profile download procedure for at least one eSIM bundle, in case that the at least one eSIM bundle capable of downloading the eSIM profile is identified based on the obtained information, and performing an eSIM bundle obtaining procedure for downloading the eSIM profile, in case that the at least one eSIM bundle is not identified based on the obtained information.

According to an embodiment of the disclosure, a terminal, applying an integrated smart secure platform (iSSP), may include an input unit, a transceiver, and a controller configured to: control the input unit to receive an input of an activation code; obtain information on an eSIM bundle where the eSIM profile is installed, in case that the activation code is related to a request of an eSIM profile; perform an eSIM profile download procedure for at least one eSIM bundle, in case that the at least one eSIM bundle capable of downloading the eSIM profile is identified based on the obtained information, and perform an eSIM bundle obtaining procedure for downloading the eSIM profile, in case that the at least one eSIM bundle is not identified based on the obtained information.

According to an embodiment, an eSIM profile package used for an eUICC may be also installed and used in an integrated secure service platform (iSSP). Therefore, even a mobile communication operator that holds or supports only an SM-DP+ server, which is a server that generates and stores an eSIM profile package, can provide a communication service and install an eSIM profile package in a terminal to which an iSSP is applied.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

Figure 1:
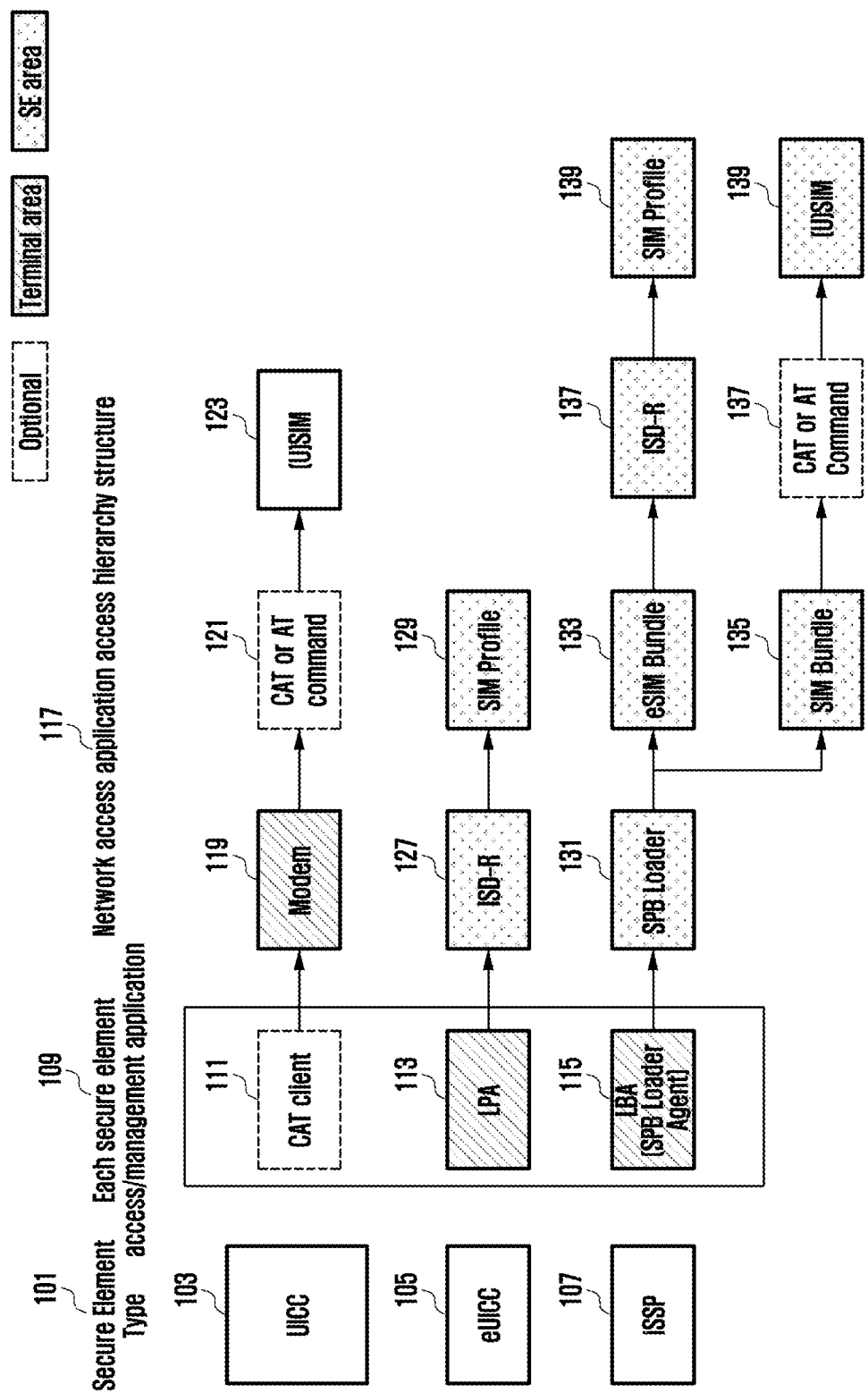
FIG. 1 illustrates a diagram of an access hierarchy structure for accessing communication operator information and an application in charge of access to/management of communication operator information for each UICC, eUICC, and iSSP according to some embodiments of the disclosure.

FIGS. 1 through 8, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

Hereinafter, the operating principle of the disclosure will be described in detail with reference to the accompanying drawings. In the following description of the disclosure, a detailed description of known configurations or functions incorporated herein will be omitted when it is determined that the detailed description may make the subject matter of the disclosure unclear. The terms as described below are defined in consideration of the functions in the embodiments, and the meaning of the terms may vary according to the intention of a user or operator, convention, or the like. Therefore, the definitions of the terms should be made based on the contents throughout the specification.

For the same reason, in the accompanying drawings, some elements may be exaggerated, omitted, or schematically illustrated. Further, the size of each element does not entirely reflect the actual size. In each figure, the same reference numerals are assigned to the same or corresponding elements. The advantages and features of the disclosure and ways to achieve them will be apparent by making reference to embodiments as described below in detail in conjunction with the accompanying drawings. However, the disclosure is not limited to the embodiments set forth below, but may be implemented in various different forms. The following embodiments are provided only to completely disclose the disclosure and inform those skilled in the art of the scope of the disclosure, and the disclosure is defined only by the scope of the appended claims. The following embodiments are provided only to completely disclose the disclosure and inform those skilled in the art of the scope of the disclosure, and the disclosure is defined only by the scope of the appended claims. Throughout the specification, the same or like reference numerals designate the same or like elements.

In addition, in describing the disclosure, when it is determined that a detailed description of a related function or configuration may unnecessarily obscure the subject matter of the disclosure, the detailed description thereof will be omitted. The terms which will be described below are terms defined in consideration of the functions in the disclosure, and may be different according to users, intentions of the users, or customs. Therefore, the definitions of the terms should be made based on the contents throughout the specification. Hereinafter, a base station is a subject that performs resource allocation to a terminal, and may be at least one of a gNode B, an eNode B, a Node B, a base station (BS), a radio access unit, a base station controller, or a node on a network.

The terminal may include a user equipment (UE), a mobile station (MS), a cellular phone, a smart phone, a computer, or a multimedia system capable of performing a communication function. In the disclosure, a downlink (DL) is a radio transmission path of a signal transmitted from a base station to a terminal, and an uplink (UL) means a radio transmission path of a signal transmitted from a terminal to a base station. Although an LTE or LTE-A system may be described as an example hereinafter, embodiments of the disclosure may be applied to other communication systems having a similar technical background or channel form. For example, the 5th generation mobile communication technology (5G, new radio, NR) developed after LTE-A may be included in a system to which embodiments of the disclosure may be applied, and 5G hereinafter may be a concept including existing LTE, LTE-A, and other similar services.

Further, the disclosure may be applied to other communication systems via some modifications without departing from the scope of the disclosure, according to determination by those skilled in the art. Here, it will be understood that each block of the flowchart illustrations, and combinations of blocks in the flowchart illustrations, can be implemented by computer program instructions. These computer program instructions can be provided to a processor of a general purpose computer, special purpose computer, or other programmable data processing apparatus to produce a machine, such that the instructions, which are executed via a processor of a computer or a processor of data processing equipment capable of other programming, creates a means for performing functions described in the flowchart block or blocks.

These computer program instructions may also be stored in a computer usable or computer-readable memory that can direct a computer or other programmable data processing apparatus to function in a particular manner, such that the instructions stored in the computer usable or computer-readable memory produce an article of manufacture including instruction means that implement the function specified in the flowchart block or blocks. The computer program instructions may also be loaded onto a computer or other programmable data processing apparatus to cause a series of operational steps to be performed on the computer or other programmable data processing apparatus to produce a computer implemented process such that the instructions that execute on the computer or other programmable data processing apparatus provide steps for implementing the functions specified in the flowchart block or blocks.

Further, each block of the flowchart illustrations may represent a module, segment, or part of a code, which includes one or more executable instructions for implementing the specified logical function(s). It should also be noted that the functions noted in the blocks may occur out of the order in some alternative implementations. For example, two blocks shown in succession may in fact be executed substantially concurrently or the blocks may sometimes be executed in the reverse order, depending upon the functionality involved. As used herein, "-unit" refers to a software element or a hardware element, such as a field programmable gate array (FPGA) or an application specific integrated circuit (ASIC), which performs a predetermined function. However, the "unit does not always have a meaning limited to software or hardware. The "-unit" may be configured either to be stored in an addressable storage medium or to execute one or more processors. Therefore, the "-unit" includes, for example, software elements, object-oriented software elements, class elements and task elements, processes, functions, properties, procedures, subroutines, segments of a program code, drivers, firmware, micro-codes, circuits, data, database, data structures, tables, arrays, and parameters.

Elements and functions provided by the "-unit" may be either combined into a smaller number of elements and the "-units" or divided into a larger number of elements and the "-units". Moreover, elements and the "-unit" may be implemented to reproduce one or more CPUs within a device or a security multimedia card also, in an embodiment, "-unit" may include one or more processors.

In the disclosure, if an activation code is detected in an iSSP terminal, as predetermined information for downloading an eSIM profile package by a local bundle assistance (LBA) installed in the terminal, the terminal may retrieve and collect information of eSIM bundles installed in an iSSP, and then may perform downloading to one of the retrieved eSIM bundles so as to install the eSIM profile package. If there is no eSIM bundle retrieved in the terminal, or if it is determined not to use the retrieved existing eSIM bundle according to a configuration of the terminal or selection of a user, the iSSP terminal may generate an eSIM bundle by itself on the basis of predetermined information stored in the terminal, or may generate an eSIM bundle via interworking with an SPBM server or communication with the terminal or the server, and then may download and install the eSIM profile package in the eSIM bundle.

In a wireless communication system, a universal integrated circuit card (UICC) is a smart card used by insertion into a mobile communication terminal and the like, and the UICC may include an access control module for accessing a network of a mobile communication operator. According to some embodiments, examples of the access control module may include a universal subscriber identity module (USIM), a subscriber identity module (SIM), an IP multimedia service identity module (ISIM), and the like, and is not limited to the above example. The UICC is also referred to as a UICC card, a USIM card, or a SIM card, and may usually be referred to as a SIM card. The UICC stores private information of a mobile communication subscriber, and authenticates the subscriber and creates a traffic security key when the subscriber accesses a mobile communication network, thereby making it possible to stably use the mobile communication.

Due to proliferation of an Internet of Things (IOT) field, an embedded UICC (eUICC) is being applied to various terminals, such as wearable devices, automobiles, and smart meters. The eUICC may mean a UICC card that can be selected by downloading a SIM module. That is, the eUICC may include a UICC card that is fixed or not fixed to a terminal from among UICC cards that may be selected by downloading a SIM module remotely, and SIM module information downloaded in the eUICC may be referred to as an eUICC profile.

The eUICC profile may be used interchangeably with terms of SIM profile, eSIM profile, eSIM profile package, and eSIM profile. A server that generates, prepares, or stores an eSIM profile so as to be download is called a subscription manager and data preparation server, an SM-DP server, a subscription manager and data preparation+ server, an SM-DP+ server, or a DP+ server.

Recently, standardization of the integrated smart secure platform (iSSP) is being conducted by the European telecommunication standards institute (ETSI). The iSSP refers to a hardware security module (SSP) integrated in a communication processor or application processor chip (system on a chip (SoC)), and the SoC is generally soldered to a terminal in an undetachable manner.

The iSSP may include a primary platform and a secondary platform bundle, the primary platform may include at least one of a hardware platform and a low level operating system (OS), and the secondary platform bundle may include at least one of a high-level OS and an application executed on the OS. The secondary platform bundle may also be referred to as an SPB or bundle.

Downloading a bundle may be expressed as downloading an image. A server which prepares or stores an image to be download is called a secondary platform bundle manager or an SPBM.

The SPBM may be generated in an upgraded form of an existing SM-DP+ server or a new server, and may exist in the form of integration with the SM-DP+ server. As mentioned above, the image may include a high-level OS and an application executed on the OS, and may exist in a form without an application. An application including an access control module for accessing a mobile communication operator's network among applications installed and executed in a bundle is referred to as a network access application (NAA). The current standard defines an SPB having a telecom attribute, and the telecom SPB may include an eSIM bundle having an attribute corresponding to one eUICC and a SIM bundle having an attribute corresponding to one UICC. Of course, the SPB is not limited to the above example. An eUICC profile may be downloaded, installed, and executed in an eSIM bundle of an iSSP or an eUICC, and when the eUICC profile is downloaded, installed, and executed in the eSIM bundle of the iSSP, the eUICC profile may also be referred to as an NAA.

In order to download a telecom bundle, an SPBM server should be established in an iSSP terminal. However, eSIM Infra (SM-DP+, activation code, etc.) support is required in an iSSP before complete conversion to an SPBM. A communication service provider that does not want a custom SIM OS is expected to maintain SM-DP+ without switching to the SPBM, and accordingly, it is determined that a solution that also accepts an SM-DP+ server-only operator is needed.

The 3rd generation partnership project (3GPP) has officially accepted eUICC for the 5G primary standard (completed in June 2018), and ETSI's iSSP is also planning to officially accept eUICC for the 5G secondary standardization which will be carried out by December 2019. Accordingly, it is expected that terminals supporting UICC, eUICC, or iSSP SoC chips will be released in the future. The GSMA is also discussing standardization on iUICC. The iUICC is a form in which an existing eUICC is fixed to a modem, and an internal structure thereof is similar to that of the iSSP. However, it is expected that the iUICC will support only an eSIM bundle.

As the market requirement for dual SIM function support to enable concurrent use of two mobile communication networks in one terminal increases, it is expected to launch terminals, in which various secure elements (SE) to support dual SIM functions, such as UICC and eUICC, eUICC and eUICC, and eUICC and iSSP SoC chips, are combined.

In order for a user to read information stored in an eUICC and display the read information in a terminal to which the eUICC is applied, the terminal should execute a local profile agent (LPA) application defined by the global system for mobile communication association (GSMA), and a local bundle assistant (LBA) application defined by ETSI should be executed in the iSSP. In an iSSP, in order to download, install, and execute a profile in an eSIM bundle of the iSSP, an LBA of the iSSP may support a function of the LPA, or an LPA module may be separately installed in the terminal. In the specification, an example in which an LPA function is integrated into an LBA is described as an example, but is not limited thereto.

In the specification hereinafter, a SIM card is used to refer to a UICC card, a USIM card, a UICC including an ISIM, and the like. In other words, technical application to the SIM card may be equally applied to a USIM card, an ISIM card, or a general UICC card.

According to some embodiments, the SIM card stores private information of a mobile communication subscriber, and authenticates the subscriber and creates a traffic security key when the subscriber accesses a mobile communication network, thereby making it possible to stably use the mobile communication.

According to some embodiments, the SIM card may be manufactured as a dedicated card for a specific mobile communication operator at a request of the operator when the SIM card is manufactured, and authentication information for accessing a network of the operator, for example, a universal subscriber identity module (USIM) application and international mobile subscriber identity (IMSI), a K (subscriber key) value, an operator constant (OPc) value, etc. may be preloaded in the SIM card and released. Therefore, the manufactured SIM card is received by a corresponding mobile communication operator and provided to a subscriber, and if necessary at a later time, a terminal may perform management, such as installation, modification, and deletion of an application in the UICC by using technologies, such as an over the air (OTA) technology.

A subscriber may be able to use an application service and a network of a mobile communication operator by inserting a UICC card into an owned mobile terminal, and may use a personal phone book, a mobile communication phone number, and authentication information stored in the UICC card, as they are, in a new terminal by transferring and inserting the UICC card from the existing terminal to a new terminal when replacing the existing terminal with the new terminal. According to some embodiments, when a SIM module is remotely downloaded and installed in the UICC card, the SIM module of a mobile communication service that a user wants to use at a desired point in time may be downloaded in the UICC card. Further, according to some embodiments, a plurality of SIM modules are downloaded and installed in the UICC card, and only one SIM module therefrom may be selected and used. The UICC card may be fixed or not fixed to the terminal. In particular, a UICC fixed to a terminal is called an eUICC (embedded UICC).

In the specification hereinafter, among UICC cards in which a SIM module may be remotely downloaded and selected, all UICC cards that are fixed or not fixed to a terminal are referred to as eUICC. Downloaded SIM module information is referred to as an eUICC profile or an eSIM Profile. In the specification hereinafter, a communication service operator may be used in the same sense as a service operator, a communication operator, a mobile communication operator, and a communication company. For the convenience of description, in the specification hereinafter, terms and names defined in the ETSI standard are used in the case of the iSSP, and terms and names defined in the GSMA standard are used in the case of the eUICC. However, the disclosure may not be limited by the terms and names, and may be equally applied to a system that is based on another standard.

As disclosed above, a technical task to be achieved by the disclosure is to provide a method and apparatus to allow a terminal, to which an iSSP is applied, to accept a remote SIM provisioning scheme defined in the GSMA, and to download, install, and open an eSIM profile package to enable a communication service.

In particular, the disclosure includes the following embodiments to achieve the task:

a method of detecting whether predetermined information input to a terminal is information for eSIM profile download, and if a specific condition is satisfied, retrieving an eSIM bundle installed in the terminal without error processing;

a method of collecting, by a terminal, eSIM bundle information of an iSSP, and selecting an eSIM bundle to be used with reference to a condition specified by the terminal;

a method of, when a terminal accesses an SPB manager, requesting access including information indicating that the access is to generate or download a pre-contracted bundle, and downloading an eSIM bundle;

a method of generating or providing, by a terminal, a bundle by using predetermined information required for requesting eSIM bundle generation to an eSIM bundle or an SPBM; and a method of generating a network tunnel between an LPA and a corresponding eSIM bundle on the basis of selected eSIM bundle information, and processing a function used for the LPA via the tunnel.

FIG. 1 illustrates a diagram of an access hierarchy structure for accessing communication operator information and an application in charge of access to/management of communication operator information for each UICC, eUICC, and iSSP according to some embodiments of the disclosure.

A secure element (SE) is an element capable of downloading or installing a hardware-based network access module, and includes the UICC, the eUICC, and the iSSP mentioned above. Because the UICC, eUICC, and iSSP correspond to those described above, a detailed description thereof will be omitted.

For an application 109 configured to control operation and access to each SE, a card application toolkit (CAT) is defined as standard in the UICC, a local profile agent (LPA) is defined as standard in the eUICC, and a local bundle assistant (LBA) is defined as standard in the iSSP, and the application 109 configured to control the operation and access to each SE may allow a terminal user to control the operation and access to each SE via the application 109, including a user interface (UI) function of a terminal.

An LBA 115 includes a secondary platform (SPB) loader agent, and the SPB loader agent communicates directly with an SPB loader 131 of the iSSP. The card application toolkit (CAT) client 111 is defined as a standard, and the CAT client 111 may optionally exist. The CAT client 111 may acquire SIM application 123 information in the UICC and may perform reply, via communication with a CAT 121 of the UICC. In the case of a terminal without a UI, a modem 119 may request and acquire information of the SIM application 123 in the UICC directly via an AT command 121 message.

According to some embodiments, in an eUICC 105, if a terminal user is to view communication operator information in an LPA 113, the LPA 113 may request information relating to an eSIM profile 129, i.e., a SIM application, from an issuer security domain root (ISD-R) 127, and the ISD-R 127 may acquire the information from each profile and may replay acquired information.

According to some embodiments, in the case of the iSSP 107, in order for the terminal user to access the communication operator information, the LBA 115 may request communication operator information for a bundle having a telecom family identifier from an internal secondary platform bundle loader (SPBL) 131, and the SPBL 131 may collect metadata of the bundle, as a telecom bundle, from an eSIM bundle 133 and a SIM bundle 135 and may reply a result of the requested information.

According to some embodiments, the SPBL 131 may bring only a metadata value of the bundle, and the eSIM bundle 133 may not store information of a profile in the metadata of the bundle. Therefore, in the case of the eSIM bundle 133, the communication operator information may not be replied. In order for the eSIM bundle 133 to reply to the communication service provider information of the profile, the SPBL 131 may enable the eSIM bundle 133 or the SPBL may enable the LPA, and the LPA may re-enable the eSIM bundle so as to access the eSIM bundle 133.

Figure 2:
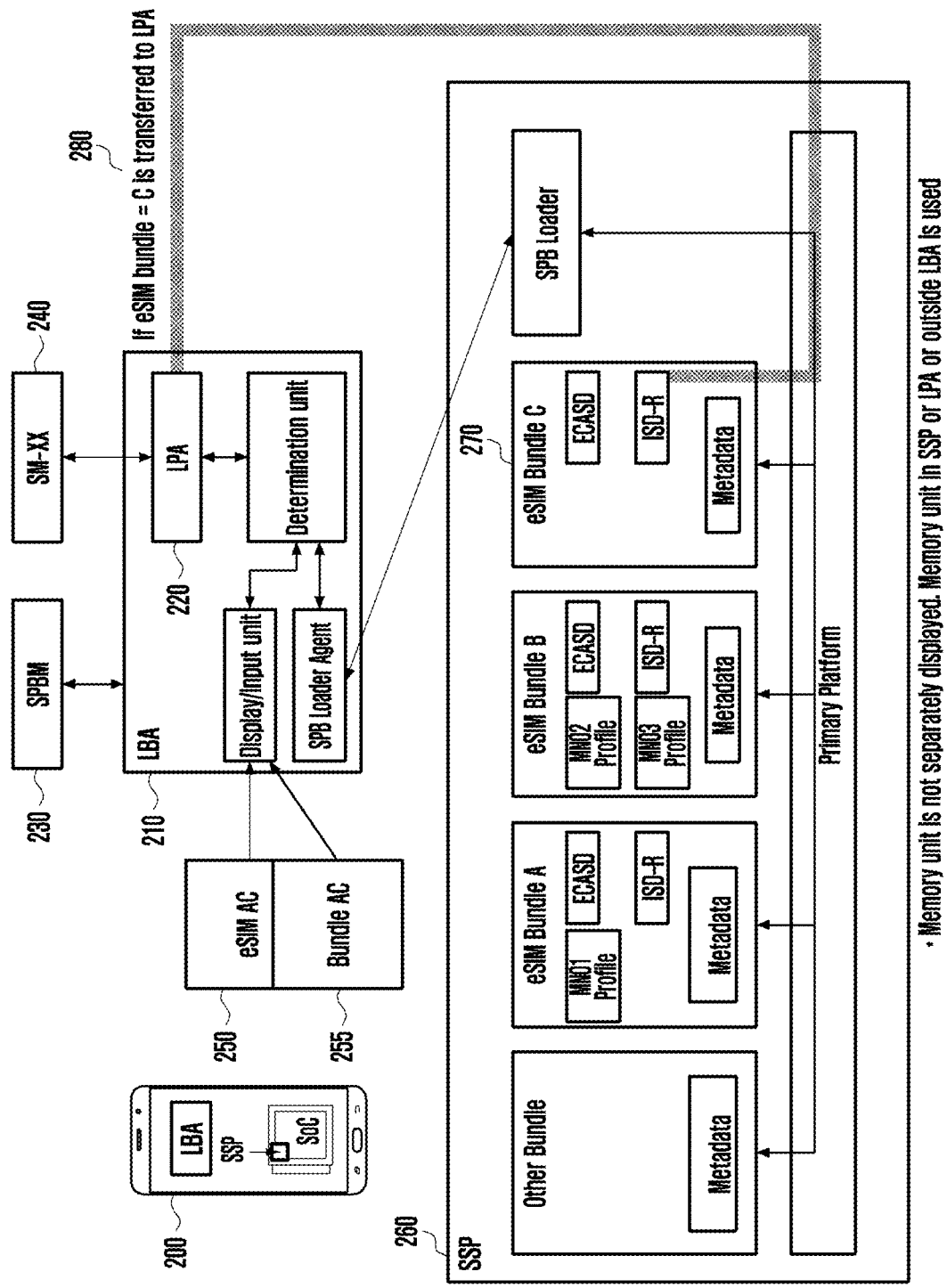
FIG. 2 illustrates a diagram of an environment for eSIM profile installation in an iSSP terminal according to an embodiment of the disclosure.

FIG. 2 illustrates a diagram of an environment for eSIM profile installation in an iSSP terminal according to an embodiment of the disclosure.

In a terminal 200, an SSP is fixed to a modem in an SoC form, and an LBA 210 exists as a separate application. In the terminal in which an eUICC is mounted, an end user may input an activation code or an advanced activation code 250 to the terminal, as predetermined information necessary for downloading and installing an eSIM profile package in the terminal (for example, inputting directly using a keyboard, scanning a quick response (QR) code, or inputting to the terminal via communication with the terminal and the server).

The activation code or the advanced activation code may be labeled as AC and AAC, and the AC includes the AAC. The activation code may include an SM-DP+ address that is a SIM server capable of downloading a profile or a server capable of informing the SM-DP+ address, a token value indicating whether a purpose is to download the profile in SM-DP+, authentication information, and the like, and the advanced activation code may include a uniform resource locator (URL) of a secure web portal capable of downloading the profile. The AC for downloading the eSIM profile may be labeled as an eSIM AC. If the AC and the AAC are input in the form of a QR code, LPA: is prefixed.

In the iSSP terminal, a bundle activation code for downloading a bundle image may be introduced 255, and may exist as a bundle activation code or a bundle advanced activation code. The bundle activation code or the bundle advanced activation code may be labeled as bundle AC and bundle AAC, and the bundle AC includes the bundle AAC.

The bundle AC may be distinguished by including, in QR code information, LBA: or identifier information indicating that the bundle AC is for downloading a bundle from the iSSP. The bundle AC may include all or a part of a bundle AC Identifier (e.g., AC_Format=3), an SPBM server address, iSSP Info( ) and an AC Token, and may include, as additional information, a family ID and a bundle class, an SPBM owner ID, and a predefined parameter between the SPBM and the iSSP. The bundle AAC may include all or a part of service operator web server addresses (e.g., AC_Format=4), and may include, as additional information, an SPBM server address, iSSP Info( ) an AC Token, a family ID and bundle class, an SPBM owner ID, and a predefined parameter between the SPBM and the iSSP.

As mentioned above, the bundle AC or an eSIM RSP AC for downloading the eSIM profile package may be input in a QR code form and in a form other than the QR code form. For example, there is a method of pressing a specific button as an input for requesting to download an eSIM profile or inputting text, by a user. Alternatively, there is a method of, in an application configured to perform a communication opening service, clicking, by the user, a button as an input for requesting to download the eSIM profile, or receiving, by the terminal, a value returned by a specific function. Alternatively, a method may include storing, in a server, a specific event value indicating the download of the eSIM profile in the iSSP, and periodically polling whether the specific event value is in the server.

If predetermined information is received by the terminal in various forms as described above, a display/input unit of an LBA 210 of the terminal detects whether the activation code is for the eSIM, on the basis of the information. The LBA 210 may include an LPA 220 function in order to download the eSIM profile in an eSIM bundle. The LPA may communicate with SM=DS, which stores an event value, and an SM-DP+ address or SM-DP+ which is an eSIM profile generation and storage server configured to download a profile, and is marked 240 as SM-XX herein.

The LBA is connected and communicates with an SPBM server that is a server configured to generate and store a bundle image for downloading and installing a bundle image. Since the SPBM 230 server has been described above, a detailed description thereof will be omitted.

A smart secure platform (SSP) 260 may also include bundles that do not include network access applications, such as multiple eSIM bundles and payments. If the LBA determines that the input AC/AAC value requires the LPA 220, the LPA 220 is executed, and if eSIM bundle information in the iSSP that the LPA 220 is to access is given and the bundle is enabled, the LPA 220 may directly communicate 280 with an ISD-R of the bundle.

Although a location of a memory is not shown separately, the iSSP includes the memory, and the memory may include information, such as a bundle activation code, predetermined information necessary for bundle generation, and the like.

Figure 3:
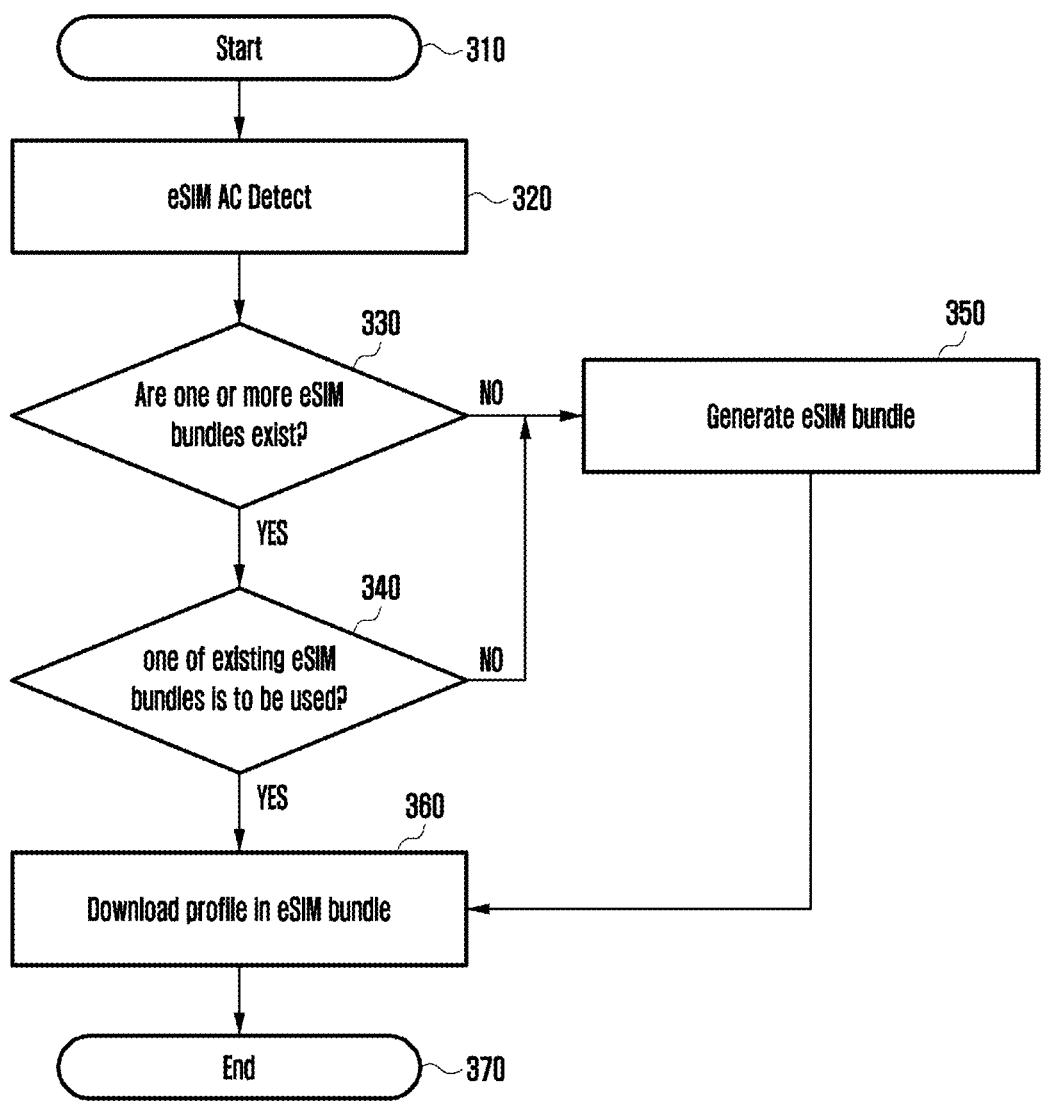
FIG. 3 illustrates a diagram of a basic procedure of eSIM profile installation in an iSSP terminal according to an embodiment of the disclosure.

FIG. 3 illustrates a diagram of a basic procedure of eSIM profile installation in an iSSP terminal according to an embodiment of the disclosure.

When predetermined information is input in an iSSP terminal, the terminal detects 320 whether an eSIM activation code exists. The predetermined information may be manually or automatically input to the terminal via a QR code scan, a user's text input, a camera input, etc., and the terminal determines, according to a preconfigured command, whether the predetermined information is an eSIM activation code that is a separate user input (e.g., a button click) enabling distinguishment of LPA: prefix and the LPA, and a predefined specific function value or event value for indication of downloading the eSIM profile.

In the above procedure, the terminal may concurrently perform a capability check of the terminal in order to determine whether the terminal can support eSIM profile download. In the procedure, the terminal determines whether the terminal is equipped with only the iSSP, whether the terminal supports an LPA function, or whether the terminal is capable of generating an eSIM bundle by itself or generating an eSIM via interworking with a server.

If the eSIM AC is detected, the LBA of the terminal requests information on an eSIM bundle installed in the iSSP, and determines 330 whether an eSIM bundle which can be used for downloading an installing one or more profiles are exist in the terminal.

If the eSIM bundle which can be used for downloading and installing one or more profiles is existing in the terminal, the terminal determines 340 whether to select and use one of the bundles according to user determination or a terminal configuration. If none of the previously installed eSIM bundles is selected and used or if there is no available eSIM bundle, the terminal may generate 350 an eSIM bundle to download an eSIM profile.

The terminal may generate the eSIM bundle in the terminal with information acquired via a separate connection to a server which supports communication opening connected to the terminal or the memory of the terminal, or may transfer acquired predetermined information to the SPBM server to download the eSIM bundle. The terminal requests a user to select a bundle to be used from among existing bundles or generated bundles, or selects a bundle according to criteria configured to the terminal, 340.

If a bundle to be used is selected, the terminal transfers selected eSIM bundle information to the LPA, so as to perform a preparation procedure of downloading a profile in the eSIM bundle or perform downloading, 360. If the terminal does not support the LPA function of processing the eSIM profile, a message for error processing or a support failure may be displayed to the user. For example, if the terminal does not allow an AC input for downloading the eSIM profile to be used, error processing and a support failure may be displayed and the procedure is terminated.

Figure 4:
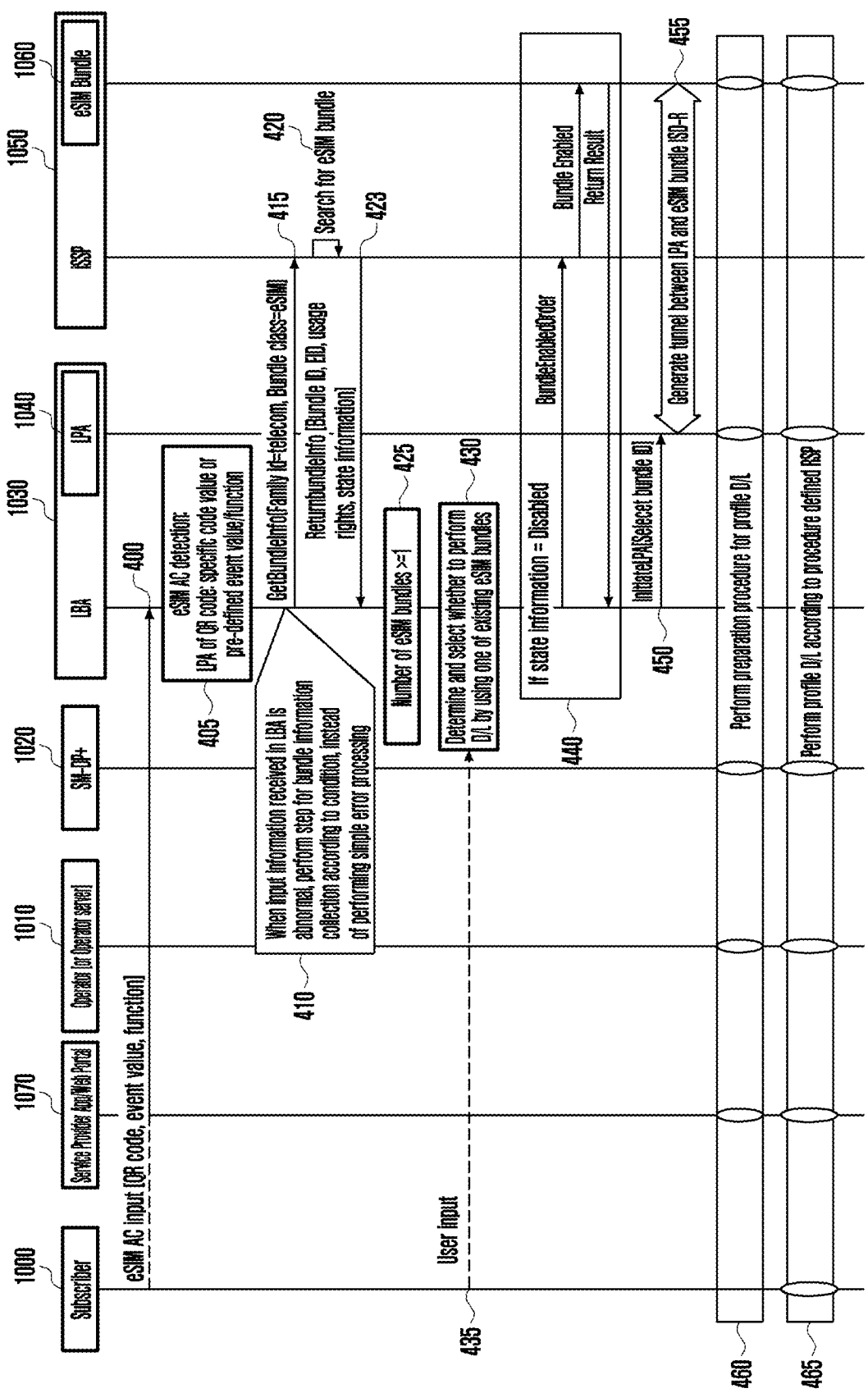
FIG. 4 illustrates a diagram of a procedure of downloading and installing, by an iSSP terminal, an eSIM profile in one of existing eSIM bundles installed in the terminal.

FIG. 4 illustrates a diagram of a procedure of downloading and installing, by an iSSP terminal, an eSIM profile in one of existing eSIM bundles installed in the terminal.

If a subscriber 1000 enters into a contract with an operator 1010 for a communication service online or offline, the subscriber 1000 may receive a QR code, a text message, etc. which include AC information necessary for downloading an eSIM profile, and may input the same to the LBA, 400. Alternatively, if the contract is signed with the subscriber 1000 in a service provider application or a web portal 1070, an event value, a function, etc., which are defined in advance with the terminal, may be pushed and input to the LBA 1030, 400.

If corresponding information is input, an LBA 1030 of the terminal detects whether there is predetermined information allowing determination of whether the information is an eSIM AC, 405. The information allowing determination of whether the information is the eSIM AC may include LPA: prefixed in a QR code, a specific code value of an AC, an event value predefined between the terminal and a server, and a function 405.

The iSSP terminal should generally process an error when input information received in the LBA 1030 is abnormal, and if the terminal supports a function for eSIM AC processing and if the above mentioned predetermined eSIM AC is detected, the terminal performs 415 a step for collecting bundle information without processing an error.

The LBA 1030 requests 415 a list and attributes for a bundle, in which a family identifier is telecom and a bundle class is eSIM, from among bundles previously installed in the iSSP 1050. The iSSP 1050 having received the request from the LBA 1030 collects and combines 420 metadata of each eSIM bundle, information stored in an SPB loader, or information requested by enabling eSIM bundles as needed, and then replies 423 a result value to the LBA 1030.

The replied result value includes 423 a bundle ID of the eSIM bundle, an EID, information on usage rights of the bundle, and a part or all of bundle state information, and necessarily includes eSIM bundle identification information. The usage rights means a list of companies permitted to download the eSIM profile in corresponding eSIM bundles. The state information means information on whether a corresponding bundle is in an enabled, disabled, or active state.

The LBA 1030 determines 425, via the replied information, whether the number of available eSIM bundles preinstalled in the terminal is one or more. If there are one or more available eSIM bundles, the terminal determines and selects 430 whether to perform downloading to one of the existing eSIM bundles. The determination of whether to perform downloading to one of the existing eSIM bundles may be inquired 435 to a user so as to be processed, and may be determined by the terminal according to a configuration of the terminal.

If it is determined to perform downloading to one of the existing eSIM bundles and replies the determination, the terminal selects 430 one of eSIM bundles detected according to a user selection or a specific determination by the terminal. If the terminal selects an eSIM bundle arbitrarily, the terminal may select an eSIM bundle in ascending order of the number of profiles installed in the eSIM bundles.

As one embodiment of the method, the following cases are possible, but are not limited thereto. The terminal preloads and releases multiple eSIM bundles, and stores, in the LBA, the number and information of unused bundles among installed bundles, and if there are bundles that are not used by mapping with bundle information replied from the iSSP, the terminal receives the user's agreement to use the bundles or randomly selects one of the bundles according to a terminal configuration. The following is an example of this.

Reply Information from iSSP
eSIM bundle, bundle ID=3, EID=XXX, installation allowed operator=Samsung, State Information=disabled LBA storage information
eSIM Bundle, Bundle ID=2, EID=XXX, usage=N
eSIM Bundle, Bundle ID=3, EID=XXX, usage=Y
eSIM Bundle, Bundle ID=4, EID=XXX, usage=N
Select and Provide any Two Unused Below
eSIM Bundle, Bundle ID=2, EID=XXX, usage=N
eSIM Bundle, Bundle ID=4, EID=XXX, usage=N In another method, a user 1000 may directly select an eSIM bundle, or when the terminal selects an eSIM bundle, in order to assist the terminal to make a determination, the LBA 1030 may concurrently or further request information, such as the number of installed eSIM profiles in eSIM bundles, a name of an installed communication service provider, etc., from the iSSP 1050 in step 415, so as use the same. When one or more eSIM bundles are detected, the procedure of selecting one eSIM bundle may be performed in step 425.

Although one or more available existing eSIM bundles are detected, if the user replies not to use the detected eSIM bundles, the LBA 1030 may perform a method of generating or terminating eSIM bundle generation according to the configuration of the terminal. The method for generating an eSIM Bundle will be described in detail with reference to FIG. 6 and FIG. 7 and will not be described in FIG. 4.

Via the above procedure, if the eSIM bundle, in which the eSIM profile is to be installed, is selected in the terminal, the LBA 1030 transfers 450, to the LPA, a command for performing a procedure for AC processing, including a selected bundle ID value. If state information of the selected bundle=a disabled state, before performing 450, the LBA performs 440 a procedure of enabling the selected eSIM bundle in the iSSP.

The LPA having received the command 450 generates 455 a network tunnel for direct connection to an ISD-R of the bundle. Thereafter, the LPA and the ISD-R of the selected bundle perform 460 a preparation procedure for profile downloading. The preparation procedure for profile downloading is performed by applying procedures and functions described in the GSMA remote SIM provisioning (RSP) standard.

After the preparation procedure is completed, a procedure for downloading an eSIM profile is processed 465 according to the GSMA remote SIM provisioning (RSP) procedure.

Figure 5:
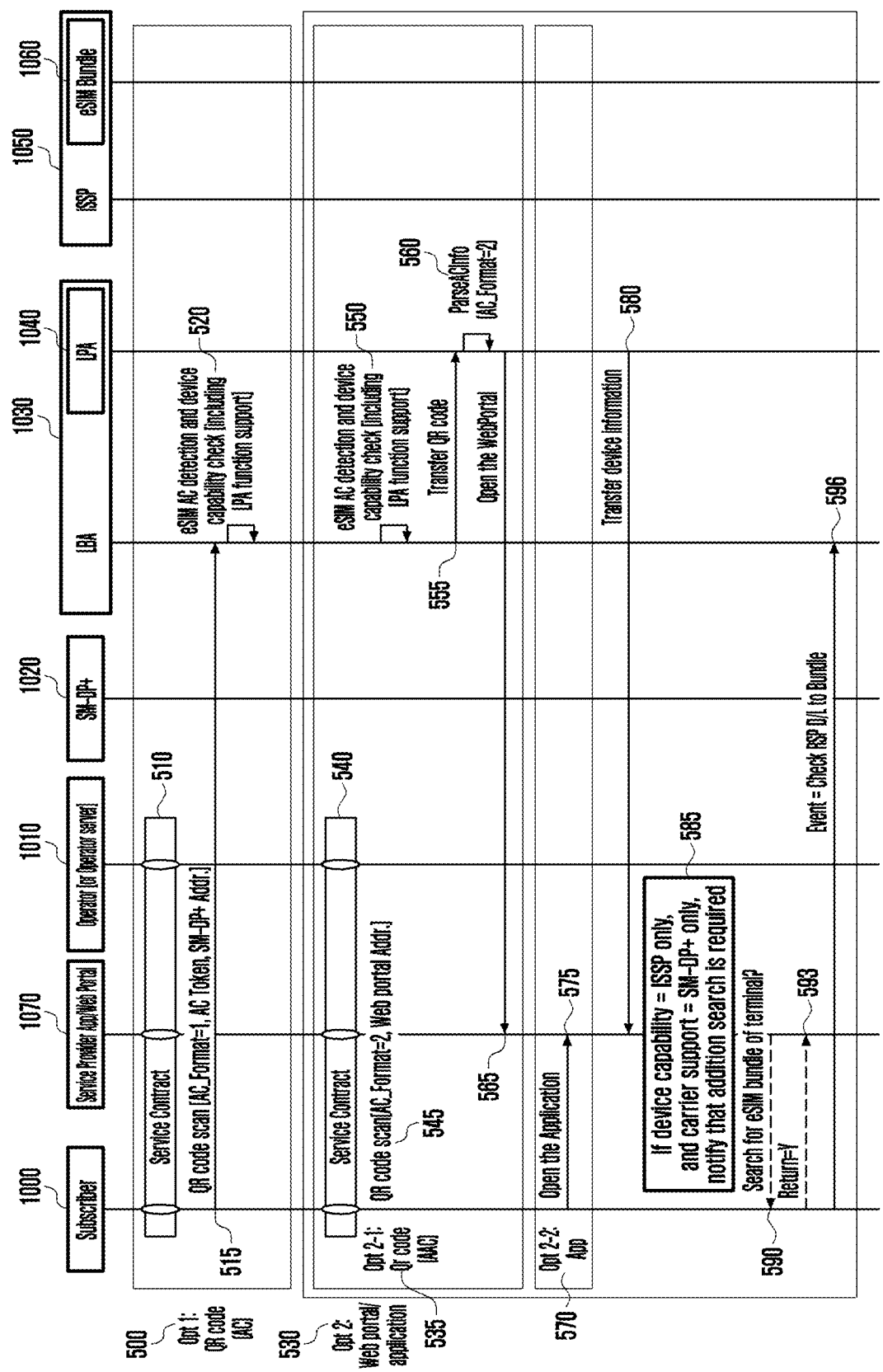
FIG. 5 illustrates a detailed diagram of a procedure of recognizing and determining an activation code for eSIM profile installation in an iSSP terminal according to the disclosure.

FIG. 5 illustrates a detailed diagram of a procedure of recognizing and determining an activation code for eSIM profile installation in an iSSP terminal according to the disclosure, and corresponds to additional descriptions of the above mentioned steps 400 and 405 in FIG. 4.

FIG. 5 illustrates a method 500 of using, by an iSSP terminal, an issued QR code, such as a voucher for installing and opening an eSIM profile, or a method 530 of installing and opening an eSIM profile via a web portal or an application.

As a first option, a method of detecting 500 an AC with a QR code will be described.

As mentioned in FIG. 4, if a subscriber 1000 enters 510 into a contract with an operator 1010 for a communication service online or offline, the subscriber may receive a QR code including AC information necessary for downloading an eSIM profile.

The user 1000 scans 515 the QR code issued via a camera of the user terminal to download the eSIM profile, and the QR code includes information relating to an SM-DP+ address, an AC Token, and AC_Format=1 as defined in the current GSMA RSP protocol. The AC Token is also referred to as a matching ID, and is a value transferred to download the eSIM profile in the SM-DP+, and the matching ID is generated in advance in an ordering procedure for profile generation between a communication operator and an SM-DP+ server. Refer to the GSMA RSP specification for details.

If a corresponding AC is input to the iSSP terminal, the LBA 1030 determines whether the input value is an AC for downloading the eSIM profile, and determines whether the terminal supports LPA, via a capability check of a device. If the AC value for eSIM downloading is detected, and if it is determined that the iSSP terminal supports an LPA function, the LBA 1030 requests 415 bundle information from the iSSP 1050 and performs the subsequent procedure mentioned in FIG. 4.

A second option is a method of opening via a Web portal or an application.

The subscriber 1000 may subscribe to a communication service through the service operator's application 1070. The service provider may be a mobile communication operator or an application of a service operator that mediates the mobile communication operator, and may be represented as an SP application or an SP app.

An example of acquiring 570 the AC via an application is as follows. The user 1000 accesses 575 the application 1070 from the iSSP terminal owned by the user. When accessing the application, the terminal transmits information of the terminal to the application.

In the case of access via the web portal, procedures 540 to 565 may be performed instead of procedure 575, and procedure 580 may be performed. When performing the procedure, the user 1000 enters into a service contract with the operator 1010 and receives a QR code as an AAC including information for accessing the web portal. The QR code includes prefix-LPA: information, and includes AC_Format=2 and an address for the web portal. Refer to the GSMA RSP specification for details on the AAC. The web portal for communication opening processing may be a web portal of a communication operator or a web portal of an operator that mediates a communication service.

Thereafter, when the user 1000 scans the QR code via the terminal, the LBA 1030 detects whether there is an eSIM AC and checks 550 a capability of the device, such as whether the device supports an LPA function or is the iSSP-only terminal, and if the LBA 1030 supports the LPA function, the LBA 1030 transfers information on the QR code to an LPA 1040 and parses 560 the same, detects 565 a web portal address, and then connects 1070 to the detected web portal address.

Subsequently, when the user 1000 requests eSIM Profile downloading, via a button click on a corresponding application or the web portal 1070, the terminal transfers 580 information of the terminal and performs a capability check on whether the terminal is a compatible terminal. If it is detected 585, via the capability check, that the terminal is an iSSP-only terminal and a selected communication service provider supports only SM-DP+, the application/web portal 1070 may display 585 a notification indicating that additional search is required to determine whether the user has an eSIM bundle in the terminal, which enables downloading of a corresponding eSIM profile.

Thereafter, the application/web portal 1070 requests 590 the user 1000 to agree to request an eSIM bundle search of the terminal, and if the user agrees 593, the user 1000 requests 596 a command (e.g., Event=Check RSP D/L to Bundle) defined in advance between the server and the terminal, from the LBA 1030 in order to search for information relating to an eSIM bundle. Upon reception of the request, the LBA 1030 transfers a request 415 for searching for the eSIM bundle information to the iSSP 1050, and performs a subsequent procedure previously described in FIG. 4. The terminal having received a notification 585 may omit user agreement procedures 590, 593 according to the configuration of the terminal or the application/web portal.

Figure 6:
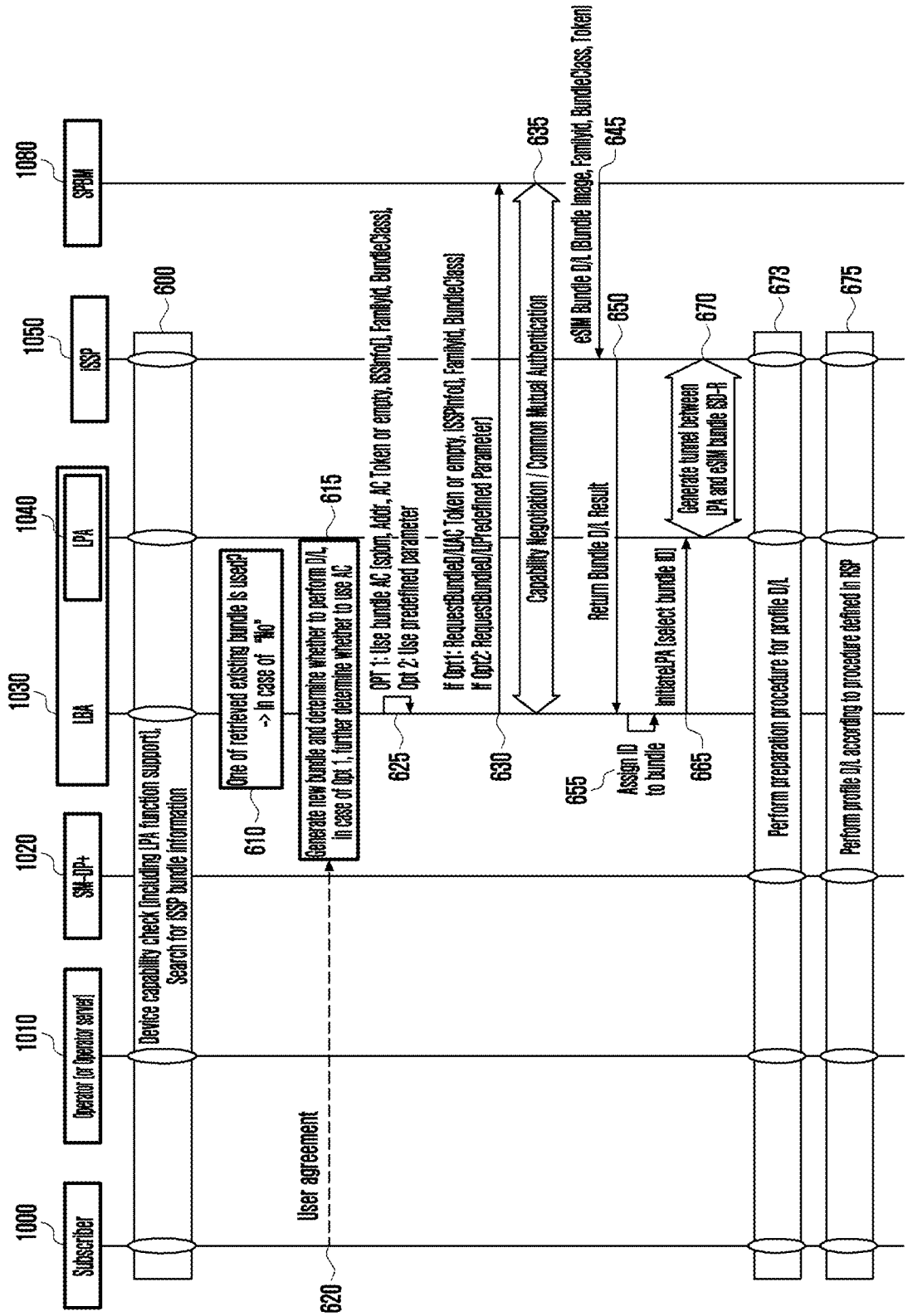
FIG. 6 illustrates a diagram of a procedure of downloading a bundle via authentication and capability negotiation between an iSSP terminal and an SPBM server, and downloading an eSIM profile in a corresponding bundle according to an embodiment of the disclosure.

FIG. 6 illustrates a diagram of a procedure of downloading a bundle via authentication and capability negotiation between an iSSP terminal and an SPBM server, and downloading an eSIM profile in a corresponding bundle according to an embodiment of the disclosure.

In FIG. 3, if an available eSIM bundle does not exist 330 or an existing eSIM bundle is not used 340, the terminal may generate 350 a bundle by using predetermined information stored in the terminal. In FIG. 6, as an example of a method of generating a bundle in 350, a method of generating an eSIM bundle in an SPBM server and downloading the generated bundle to the terminal will be described.

Entities of the subscriber 1000, the operator 1010, SM-DP+1020, the LBA 1030, the LPA 1040, and the iSSP 1050 perform a series of operations described in detail with reference to FIG. 4 and FIG. 5, input a text string or a QR code which is predetermined information, and recognize information automatically pushed to the terminal from the app, and event information that the terminal periodically goes to a specific server and polls, and the terminal detects information on an eSIM AC. After the terminal performs a capability check, including whether the terminal supports the LPA function, if the terminal is an iSSP terminal and supports the eSIM AC, the LBA 1030 requests information on the eSIM bundle from the iSSP 1050 and secure 600 the same.

If the user 1000 or the terminal decides not to use one of the eSIM bundles requested and replied or if there is no available replied eSIM bundle 610, the terminal generates a new bundle and determines whether to perform downloading, and if the terminal has a bundle AC and wants to use the AC, the terminal determines 615 whether to use the AC. Determination 615 of whether to use the AC may be processed by requesting 620 user agreement or may be determined on the basis of a configuration of the LBA.

If whether or not to use the AC is determined 615, the LBA 1030 selects and provides 625 one of two download options. A terminal manufacturer receives corresponding bundle activation codes issued for the terminal LBA 1030 or the iSSP 1050 via a pre-contract with the SPBM 1080 company and ETSI bundle activation code, may store the received bundle activation codes in a secure memory, such as the iSSP of the terminal, or may store the bundle activation codes in an opening server for communication service opening management, and then may request and receive the same from the server for use.

Option 1 is a method of storing the bundle AC in the iSSP 1060 of multiple terminals via a contract in advance and using the same when selected, and option 2 is a method of using a predefined parameter between the terminal and the SPBM 1080.

The terminal selects one of the options by determination according to the user's selection or a configuration of the terminal, and transmits, to the SPBM 1080, predetermined information necessary for download. An address of the SPBM 1080 may be stored in the iSSP 1050 or the LBA 1030 of the terminal in advance. In the case of option 1, information 630 transmitted to the SPBM 1080, which includes information stored in the bundle AC, such as an AC token, iSSP information( ) and a family ID, is transmitted to the SPBM 1080 from the LBA 1030, and in the case of option 2, transmission 630 is performed with a specific parameter as a necessary value enabling recognition of a contract defined in advance.

If information is transmitted according to option 1 and option 2, in a capability negotiation and mutual authentication procedure between the LBA 1030 and the SPBM 1080, the SPBM 1080 recognizes 635 a corresponding contract and downloads 645 the pre-contracted eSIM bundle to the iSSP 1060. The bundle includes bundle image, Familyid of the bundle, BundleClass, and authentication token required for installation on the terminal.

If a result indicating that the eSIM bundle has been downloaded and installed is replied 650 from the iSSP 1060 to the LBA 1030, the LBA 1030 assigns 655 an ID to the bundle, and transfers 6650, to the LPA 1040, a command for the LBA 1030 to perform a procedure for AC processing, including a corresponding generation bundle ID value. The LPA 1040 having received the command may generate 670 a tunnel between ISD-Rs of the bundles, and then the LPA 1040 may perform a preparation procedure 673 for downloading an eSIM profile to a selected bundle, and a profile download procedure 675 according to a procedure defined in the RSP.

Figure 7:
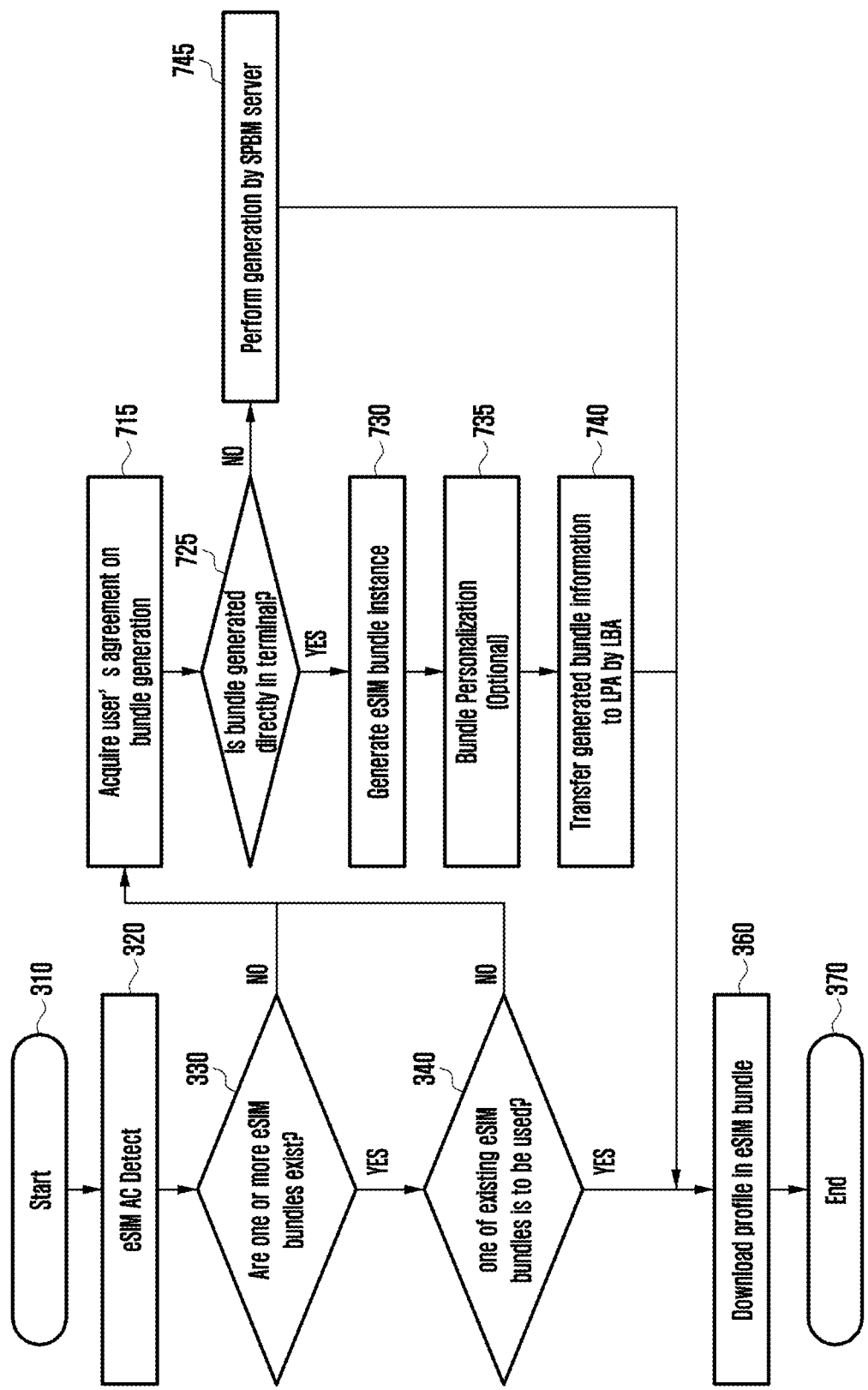
FIG. 7 illustrates a diagram of a procedure of generating a bundle by itself in an iSSP terminal according to an embodiment of the disclosure.

FIG. 7 illustrates a diagram of a procedure of generating a bundle by itself in an iSSP terminal according to an embodiment of the disclosure.

In FIG. 3, if an available eSIM bundle does not exist 330 or an existing eSIM bundle is not used 340, the terminal may generate 350 a bundle by using predetermined information stored in the terminal. In FIG. 7, as a method of generating an eSIM bundle in 350, a method of generating an eSIM bundle by itself and providing the same will be described.

After receiving the number of eSIM bundles replied via the above-mentioned procedures of FIG. 4 and FIG. 5, in the case 330 where there is no replied available eSIM bundle or it is determined 340 not to use one eSIM bundle selected from among eSIM bundles requested by the user 1000 or the terminal and replied, the terminal may generate a new bundle and may request 715 a user agreement on whether to perform download, or may perform download without requesting a separate user agreement, on the basis of the configuration of the terminal.

If the download is allowed according to the user or the configuration of the terminal, the LBA determines 725 whether to perform a procedure for generating an eSIM bundle instance. The terminal determines whether to generate the eSIM bundle via interworking with the SPBM server or generate the eSIM bundle by itself, according to a specific condition, and a network connection state, mobility of the terminal, a specific time slot, an OS version, etc. may be considered as a condition for the determination. For example, if there is no network connection, the terminal is unable to be connected to the server, so that the terminal generates the eSIM bundle by itself.

If the terminal determines to generate the eSIM bundle by itself by combining the conditions, the terminal requests the iSSP so as to generate 730 an instance by using a specific eSIM bundle template. A method and procedure 730 of generating an instance is described as examples hereinafter.

Via a pre-contract with the SPBM/EUM, a terminal manufacturer pre-stores a specific eSIM bundle template enabling instance generation and predetermined information necessary for authentication of the eSIM bundle template, in a secure memory of the terminal such as iSSP. If it is determined that the terminal generates the eSIM bundle by itself, the LBA selects a bundle template pre-stored in the iSSP, and transmits an instantiate command (e.g., instance generation=tag 1).

If the selected eSIM bundle of the iSSP receives the instantiate command, the bundle is copied including information included in ECASD. The ECASD is a module in charge of managing and generating keys and certificates related to security and authentication in the eSIM bundle, and should store ECASD GSMA CI root public keys, ECASD content, EUMs Keysets for update (key/certificate update), EUM certificates for eUICC authentication (CERT.EUM.ECDSA), eUICC private keys (SK.EUIC-C.ECDSA) for generating ECDSA signatures, and eUICC certificates (CERT.EUICC.ECDSA).

Alternatively, only the bundle template is copied from the eSIM bundle, and then predetermined information necessary for bundle authentication is generated on the fly in a primary platform of the iSSP and injected into the bundle.

As an example of the procedure, the iSSP has an EUM keyset, GSMA CI root public keys, EID, and EUM certificates in advance, and when a request for bundle generation is received from the LBA, the iSSP uses a corresponding EUM Keyset in the primary platform of the iSSP, and generates a private key and public key pair. Afterwards, the eUICC certificate is generated and stored in the ECASD by signing with the EID, the generated public key, and the EUM certificate.

When generating a private key and public key pair, if the pair is generated by extraction and use of the same key derived from the same variable, or using EID and eUICC certificate as the same value, the bundle having the same EID and eUICC certificate is generated in multiple terminals, and the terminal assigns a different bundle ID value to each bundle for management. If profile information stored in an SM-DP+ server and a specific bundle is required for mutual authentication, the LBA transfers the bundle ID information to the LPA (InitiateLPA (selected bundle ID)), and then performs subsequent operations.

The terminal may perform an additional procedure 735 for performing personalization of the ECASD by using information stored in the iSSP. As mentioned above, the eUICC certificate is generated with the public key (PK.EUICC.ECDSA) of eUICC, EID that is an ID of eUICC, and EUM signature.

After generating an instance, ECASD personalization is performed using the eUICC certificate, the private key, and the EUM certificate. The terminal manufacturer stores, in the iSSP, the number of eUICC private keys, EUM certificates, and pre-generated and signed eUICC certificates, which are contracted by a SIM vendor in advance, and then after the instance is finished, one of the EUM certificate, the eUICC certificate, and the eUICC private key set, which are not used in the personalization procedure is selected and used for ECASD personalization. The used eUICC certificate is changed to a used state and is processed so as not to be used for the next generated eSIM bundle. If the eSIM bundle is deleted, the state of the eUICC certificate is changed to an available state again.

There is a method for securing and storing EID in advance instead of the eUICC certificate, and selecting one of unused EID values among stored EIDs, thereby immediately generating/signing and using the eUICC certificate. The eUICC certificate is signed with the EUM private key of the EUM keyset, and is stored in the ECASD of the bundle generated with the EUM certificate and the eUICC private key. If the eSIM bundle is deleted, the state of the EID is changed to an available state again.

When generation is completed, the LBA transfers bundle information to the SPBM, and the SPBM may perform update by providing metadata information of the bundle. If the terminal determines that the last time of using a template of the eSIM bundle stored in the terminal was far in the past (e.g., more than one year), when or after an eSIM bundle instance is generated 730, the terminal may access, after personalization 735, the SPBM server to determine whether there is a further OS update and may update the OS.

The LBA now assigns an ID to the bundle and transfers the bundle ID to the LPA 740 so that the LPA may perform 360 a subsequent procedure for eSIM profile D/L.

Figure 8:
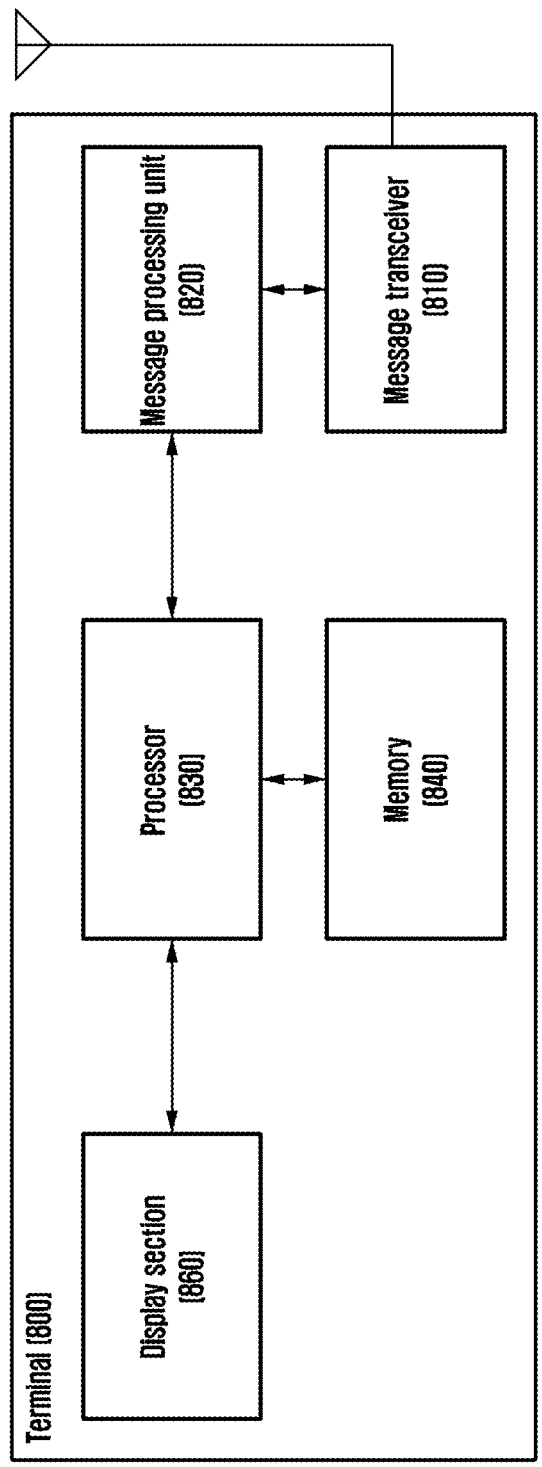
FIG. 8 illustrates a diagram of a detailed configuration of a terminal in a wireless communication system according to some embodiments of the disclosure.

FIG. 8 illustrates a detailed configuration of a terminal in the wireless communication system according to some embodiments of the disclosure.

Referring to FIG. 8, a terminal 800 includes a transceiver 810 message processing unit 820, a processor (control unit) 830, a memory 840, and a screen display unit 860. However, elements of the terminal 800 are not limited to the above description. For example, the terminal may include more elements or fewer elements than the aforementioned elements. Moreover, at least one element of the terminal 800 may be implemented in one chip form.

According to some embodiments, the transceiver 810 performs a function for transmitting or receiving a signal through a wireless channel, such as band conversion and amplification of the signal. That is, the transceiver 810 may up-convert a baseband signal to a radio frequency (RF) band signal and then may transmit the up-converted signal via an antenna. The transceiver 810 may include an RF processing unit which down-converts an RF band signal received via an antenna to a baseband signal, and may further include a transmission filter, a reception filter, an amplifier, a mixer, an oscillator, a digital to analog convertor (DAC), an analog to digital convertor (ADC), and the like.

Further, the transceiver 810 may receive a signal via a wireless channel, may output the signal to the processor 830, and may transmit a signal output from the processor 830 through the wireless channel. According to some embodiments, in FIG. 8, only one antenna is illustrated, but the terminal may include a plurality of antennas. The transceiver 810 may include a plurality of RF chains.

The transceiver 810 may perform beamforming. For beamforming, the transceiver 810 may adjust a phase and a magnitude of each of signals transmitted or received via a plurality of antennas or antenna elements. The baseband processing unit in the transceiver 810 performs a function of converting between the baseband signal and a bitstream according to the physical layer standard of the system. For example, during data transmission, the baseband processing unit generates complex symbols by encoding and modulating a transmission bitstream. When receiving data, the baseband processing unit restores the received bitstream by demodulating and decoding the baseband signal provided from the RF processing unit. For example, in the case of following an orthogonal frequency division multiplexing (OFDM) scheme, during data transmission, the baseband processing unit generates complex symbols by encoding and modulating a transmission bitstream, maps the complex symbols to subcarriers, and then configures OFDM symbols by performing an inverse fast Fourier transform (IFFT) operation and cyclic prefix (CP) insertion.

Further, when data is received, the baseband processing unit divides the baseband signal provided from the RF processing unit in the unit of OFDM symbols, reconstructs the signals mapped to the subcarriers through a fast Fourier transform (FFT) operation, and then reconstructs the reception bitstream through demodulation and decoding.

The transceiver 810 may be defined as a transceiving device and may include a message transceiver. The message processing unit 820 may perform transmission via the transceiver 810 or may perform an operation of determining what type of message received data is. For example, the message processing unit 820 may determine whether the received message is a control message of a radio resource control (RRC) layer (including a system information block (SIB)) or a data message of a user. The message processing unit 820 may be included in the processor 830.

The processor 830 may control overall operations of the terminal 800. For example, the control unit 830 transmits or receives a signal via the message processing unit 820. Further, the processor 830 records and reads data in the memory 840. There may be at least one processor 830. For example, the control unit 830 may include a communication processor (CP) that performs a control for communication, and an application processor (AP) that controls a higher layer such as an application program.

According to some embodiments, if there is a bundle or activation code stored in the memory 840 in advance, the processor 830 may request corresponding information from the memory 840 so as to allow the screen display unit 860 to display the information, or may receive the information to perform an additional operation.

The processor 830, the message processing unit 820, and the transceiver 810 may control the terminal 800 so as to access an operator network selected according to a user or a terminal configuration. According to some embodiments, the processor 830 matches a data record read via the memory 840 or information collected by the processor 830, the message processing unit 820, and the transceiver 810, so as to perform a procedure of inferring, by the terminal, information that can be referred to for service selection. According to some embodiments, the processor 830 may determine whether a user agreement for specific information stored in the terminal 800 is required, and may display a determination result on the screen display unit 860.

The processor 830 may control the terminal 800 to perform an operation corresponding thereto. According to some embodiments, the processor 830 may include an application that is responsible for executing and controlling a secure element, such as LPA, CAT, and LBA. Further, the processor 830 may determine whether an LPA operation for eSIM profile processing is required, and acquire predetermined information necessary to generate a bundle via the processor 830 and the memory 840 so as to process subsequent procedures.

The processor 830 acquires profile download type information that can be provided by a communication operator, which has been collected via the message processing unit 820 and the transceiver 810, and may combine the profile download type information with the presence or absence of the iSSP and information on the iSSP, which are acquired from the memory 840 of the terminal 800, so as to control the terminal 800 to determine a storage location of profile and store the same as a required bundle.

In addition, information on the profile type that may be provided by the operator may include at least one of a telecom group identifier, a telecom group class, eSIM bundle identification information, and SIM bundle identification information. The processor 830 may combine capability information of the terminal, which is acquired from the message processing unit 820, the transceiver 810, and the memory 840, with predetermined information input from the screen display unit 860 so as to determine whether the terminal supports eSIM profile download, and if the terminal supports the eSIM profile download, the processor 830 may determine whether to perform an additional procedure for eSIM bundle generation or perform download to an existing eSIM bundle.

The processor 830 may control the terminal 800 to transmit and process a request for securing a bundle activation code stored in the memory 840 or predetermined authentication information required for bundle generation. According to some embodiments, the processor 830 may receive the bundle activation code from the memory 840, may transmit information to the SPBM server via the message processing unit 820 and the message transceiver unit 810, and may select a specific parameter to transmit information to the SPBM server via the message processing unit 820 and the message transceiver unit 810. If it is determined that the terminal does not provide an LPA function, the processor 830 may control the terminal 800 to limit an operation for downloading an eSIM profile.

The memory 840 stores data, such as basic programs, application programs, and configuration information for the operation of the terminal 800. The memory 840 may include UICC, eUICC, iSSP, and iUICC, which are hardware security modules built in the terminal. In an embodiment, the memory 840 includes a storage medium or a combination of storage media, such as a ROM, a RAM, a hard disk, a CD-ROM, a DVD, and the like, and provides stored data at a request of the processor 830. The memory 840 may be integrated with the processor 830 and a system on chip (SoC). For example, in the case of the iSSP, the memory 840 is integrated with the processor 830. Further, the memory 840 may include a plurality of memories.

The screen display unit 860 may display information processed by the processor 830, or may display a procedure of an operation performed by the terminal 800 via processing of the processor 830 or agreements on an event for requesting a user to execute. According to some embodiments, an input and an input result of an AC/AAC or a bundle AC/AAC may be replied to a user for display. According to some embodiments, the LBA application may control or include the screen display unit 860 and the processor 830. Of course, the disclosure is not limited to the above example.

Methods according to embodiments stated in claims and/or specifications of the disclosure may be implemented in hardware, software, or a combination of hardware and software. When the methods are implemented by software, a computer-readable storage medium for storing one or more programs (software modules) may be provided. The one or more programs stored in the computer-readable storage medium may be configured for execution by one or more processors within the electronic device. The at least one program may include instructions that cause the electronic device to perform the methods according to various embodiments of the disclosure as defined by the appended claims and/or disclosed herein.

The programs (software modules or software) may be stored in non-volatile memories including a random access memory and a flash memory, a read only memory (ROM), an electrically erasable programmable read only memory (EEPROM), a magnetic disc storage device, a compact disc-rom (CD-ROM), digital versatile discs (DVDs), or other type optical storage devices, or a magnetic cassette. Alternatively, any combination of some or all of the may form a memory in which the program is stored.

Further, a plurality of such memories may be included in the electronic device. In addition, the programs may be stored in an attachable storage device which is accessible through communication networks, such as the Internet, Intranet, local area network (LAN), wide area network (WAN), and storage area network (SAN), or a combination thereof. Such a storage device may access a device that performs an embodiment of the disclosure via an external port. Further, a separate storage device on the communication network may access a portable electronic device.

In the above-described detailed embodiments of the disclosure, an element included in the disclosure is expressed in the singular or the plural according to a presented detailed embodiment. However, the singular form or plural form is selected for convenience of description suitable for the presented situation, and various embodiments of the disclosure are not limited to a single element or multiple elements thereof. Further, either multiple elements expressed in the description may be configured into a single element or a single element in the description may be configured into multiple elements.

Although the present disclosure has been described with various embodiments, various changes and modifications may be suggested to one skilled in the art. It is intended that the present disclosure encompass such changes and modifications as fall within the scope of the appended claims.

What is claimed is:

1. A method for installing an embedded subscriber identity module (eSIM) profile by a terminal applying an integrated smart secure platform (iSSP), the method comprising:
receiving an input of an activation code;
identifying a request of an eSIM profile associated with the activation code;
obtaining information on a bundle in which a downloaded eSIM profile is to be installed, wherein the obtained information on the bundle includes information on a bundle having a specific bundle ID and a specific bundle class of at least one bundle pre-installed in the iSSP of the terminal;
selecting one bundle for the eSIM profile from at least one bundle capable of downloading the eSIM profile, in case that the at least one bundle is identified based on the obtained information; and
obtaining the one bundle for the eSIM profile, in case that the at least one bundle is not identified based on the obtained information for downloading the eSIM profile,
wherein obtaining the one bundle for the eSIM profile comprises generating the one bundle in the terminal.

2. The method of claim 1, wherein selecting the one bundle for the eSIM profile comprises:
selecting the one bundle having the specific bundle ID and the specific bundle class;
generating a tunnel configured to connect the selected one bundle and an issuer security domain-root (ISD-R); and
downloading the eSIM profile by the tunnel.

3. The method of claim 2, wherein the one bundle is selected based on a user's input or the activation code.

4. The method of claim 1, wherein obtaining the bundle further comprises:
obtaining information related to the one bundle;
transmitting, to a secondary platform bundle manager (SPBM) server, the obtained information related to the one bundle, the one bundle being generated by the SPBM based on the obtained information related to the one bundle; and
receiving the one bundle in the iSSP of the terminal from the SPBM server.

5. The method of claim 4, wherein the information related to the one bundle includes activation code information on the one bundle and preconfigured parameter information.

6. The method of claim 4, wherein the one bundle includes a bundle image, a bundle class, and authentication information for installation on the terminal.

7. The method of claim 1,
wherein the one bundle is generated based on a bundle template stored in the iSSP and information for a bundle authentication.

8. The method of claim 1, wherein the activation code is detected using a quick response (QR) code.

9. The method of claim 8, wherein the QR code includes information for accessing a web portal.

10. A terminal applying an integrated smart secure platform (iSSP), the terminal comprising:
an input unit;
a transceiver; and
a controller configured to:

control the input unit to receive an input of an activation code, identify a request of an eSIM profile associated with the activation code, obtain information on a bundle in which a downloaded eSIM profile is to be installed, wherein the obtained information on the bundle includes information on a bundle having a specific bundle ID and a specific bundle class of at least one bundle pre-installed in the iSSP of the terminal, select one bundle for the eSIM profile from at least one bundle capable of downloading the eSIM profile, in case that the at least one bundle is identified based on the obtained information, and obtain the one bundle for the eSIM profile, in case that the at least one bundle is not identified based on the obtained information for downloading the eSIM profile, wherein obtaining the one bundle for the eSIM profile comprises generating the one bundle in the terminal.

11. The terminal of claim 10, wherein, in case that the at least one bundle is identified based on the obtained information, the controller is further configured to select the one bundle having the specific bundle ID and the specific bundle class, generate a tunnel configured to connect the selected one bundle and an issuer security domain-root (ISD-R), and control the transceiver to download the eSIM profile by the tunnel.

12. The terminal of claim 11, wherein the controller is further configured to select the one bundle based on a user's input and the activation code.

13. The terminal of claim 10, wherein, in case that the at least one bundle is not identified based on the obtained information, the controller is further configured to obtain information related to the one bundle, control the transceiver to transmit the obtained information related to the one bundle, the one bundle being generated by the SPBM based on the obtained information related to the one bundle, and control the transceiver to receive the one bundle in the iSSP of the terminal from the SPBM server.

14. The terminal of claim 13, wherein the information related to the one bundle includes activation code information on the one bundle and preconfigured parameter information.

15. The terminal of claim 13, wherein the one bundle includes a bundle image, a bundle class, and authentication information for installation on the terminal.

16. The terminal of claim 10, wherein, in case that the at least one bundle is identified based on the obtained information, the controller is further configured to generate the one bundle based on a stored bundle template and information for an bundle authentication.

17. The terminal of claim 10, wherein the activation code is detected using a quick response (QR) code.

18. The terminal of claim 17, wherein the QR code includes information for accessing a web portal.

* * * * *